PROBE VOLTAGES IN AND OUT OF PHASE. AS AFFECTED BY PROBE POSITION, AND CONDITION OF TEST SPECIMEN

METER DEFLECTION TRAVERSING CRACK

DEPENDENCE OF METER DEFLECTION ON CRACK DEPTH.

PARAMETERS OF PARALLEL CIRCUIT (a) EXPRESSED
IN TERMS OF SERIES CIRCUIT (b).
R CONSTANT L VARIED

United States Patent Office 3,496,458
Patented Feb. 17, 1970

3,496,458
METHOD AND APPARATUS FOR DETECTING AND MEASURING CRACKS IN METAL STRUCTURES
Donald Edgar Bromley, 40 Wellesley Road, Slough, England
Filed Oct. 16, 1967, Ser. No. 675,677
Claims priority, application Great Britain, Oct. 20, 1966, 46,955/66
Int. Cl. G01r 33/14, 33/00, 33/12
U.S. Cl. 324—40
6 Claims

ABSTRACT OF THE DISCLOSURE

Method and apparatus for detecting and measuring cracks in metal structures in which eddy currents are induced in the metal structure from a test probe to which a substantially constant input A.C. is applied, the voltage developed across the probe being measured as from the centre of the locus relating the variation of the voltage in phase and in quadrature to the variation in the separation of the probe and the metal structure whereby the voltage developed across the probe is independent of the separation of the probe and the metal structure, changes in the resistance of the eddy current path in the metal structure due to cracks producing a change in the voltage developed across the probe. Cracks are measured by positioning the probe immediately above the crack and comparing the voltage developed across the probe with that developed when the probe is positioned immediately above a crack of known depth.

---

The present invention relates to a method and apparatus for detecting and measuring cracks in metal structures.

There is a requirement for a system capable of showing the presence and possible growth of cracks in a metal structure. The use of eddy current methods is well known for the detection of discontinuities in metal objects. However, when eddy current techniques are applied for portable field use, one of the major limitations in their application to ferrous materials is the interfering effect introduced by variations in the distance between the face of the search probe and the surface of the material being examined. Fundamentally, the eddy current method of crack detection now proposed measures the resistance of a closed circuit in the metal surface, and is specifically sensitive to surface defects such as cracks, which break the electrical continuity, but is not affected by variation in the separation of the probe and the surface of the material being examined.

The test probe used is a coil, which may be wound on a magnetic core in order to enhance effects, and which has A.C. flowing through it. When a metal workpiece is near it, currents are induced in the workpiece thereby dissipating energy; alternatively the presence of the metal changes the electrical parameters of the coil, and the conducting path in the workpiece is similar to a shorted turn of a transformer. The presence of a crack in the work underlying the coil breaks the circulating current and raises the resistance. With magnetic specimens for example (ferritic or martinsitic steels) there are certain additional considerations; because of skin effect the layer in which current circulates is very thin, the coupling of magnetic flux through the specimen is enhanced and depends upon the spacing of the specimen and coil. To complete the instrument a detector system is required responding to the electrical properties of the coil; sensitive to those changes due to the presence of defects but not to extraneous factors such as position of the probe. The method may be used by scanning the detecting probe over the metal surface, the response of the instrument indicating the presence of defects, or the probe may be fixed, and its response used to show the propagation of a defect beneath it.

The invention will be further described, with reference to the accompanying drawings in which:

FIGURE 5b shows the equivalent circuit of the arrangement shown in FIGURE 5a;

Figure 1:
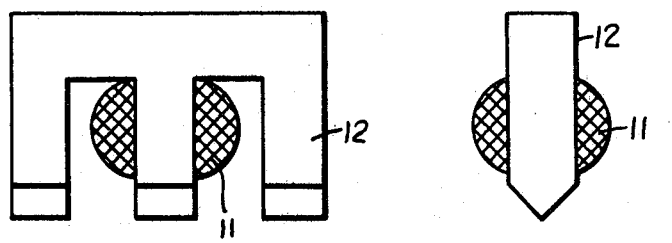
FIGURE 1 shows diagramatically side and end elevations of a test probe for use in an embodiment of the invention.

Details of probe construction will be considered more fully later, but briefly as shown in FIGURE 1 a winding 11 of 500 turns of 36 S.W.G. wire was used on the central leg of an E shaped core 12, made up of Mu-metal laminations coupled together as shown in FIG. 1.

Figure 2:
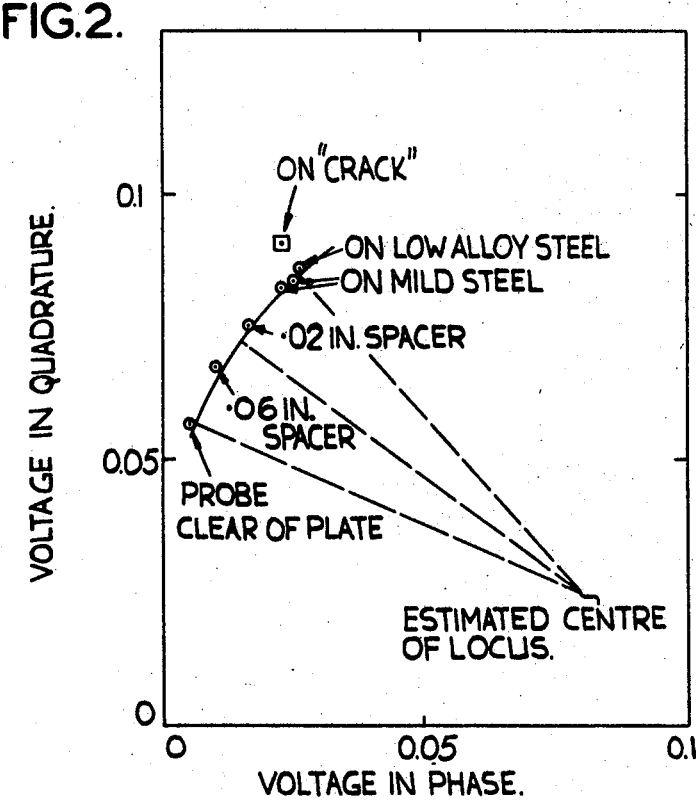
FIGURE 2 is a graph relating voltages developed across a probe such as that of FIGURE 1 to the separation of the probe and a test specimen.

The method of measuring now described is insensitive to changes due to probe position when used on ferromagnetic materials, so it does not require as hitherto that the probe be positioned with great accuracy. Its operation depends upon the detailed electrical behaviour of the probe. The behaviour of the probe in practice is best followed by plotting the phase and magnitude of the voltage developed across the probe for a constant alternating input current for varying positions of the probe as shown in FIG. 2. This means in effect that the inductive and the resistive components of the impedance of the probe are treated as series elements, the input current to the probe being supplied from an oscillator with a large resistance in series, and the phase and magnitude of the voltage developed across the probe being read on a Quadrature voltmeter. When the probe is well clear of any metallic object its impedance is almost entirely inductive with a small resistive component from the ohmic resistance of the coil winding and the current feed circuit.

When the probe is placed on a piece of ferrite (non-conducting magnetic material) the inductance rises as expected. When placed on a ferromagnetic material such as steel the rise in inductance is less, but a resistive component appears as well.

If the voltages developed across the probe in phase and in quadrature with the input current to the probe are plotted against each other for different separations of the probe from the surface of the steel, the resultant voltage is found to lie on a smooth curve that can be shown by a theoretical argument to be an arc of a circle. Therefore, if a compensating voltage represented in phase and amplitude by the centre of this circle is vectorially added to the measured voltage, the resultant voltage is constant in amplitude, being represented by the radius vector of the circle. That is, the measured amplitude of the voltage is independent of the separation of the probe from the surface of the steel.

If the resistance of the eddy current path is changed, however, due to the presence of the crack or the use of a different material, the observed voltage will no longer lie on the curve, but will have a different amplitude. This amplitude, however, will still be independent of the separation of the probe from the surface of the steel.

A compensating voltage appropriate to the centre of the curve is produced in a balanced circuit by shunting an inductor with a variable resistor, (giving some adjustment) and this is vectorially added to the probe voltage by connecting a secondary winding of the inductor in series with the probe.

Figure 3:
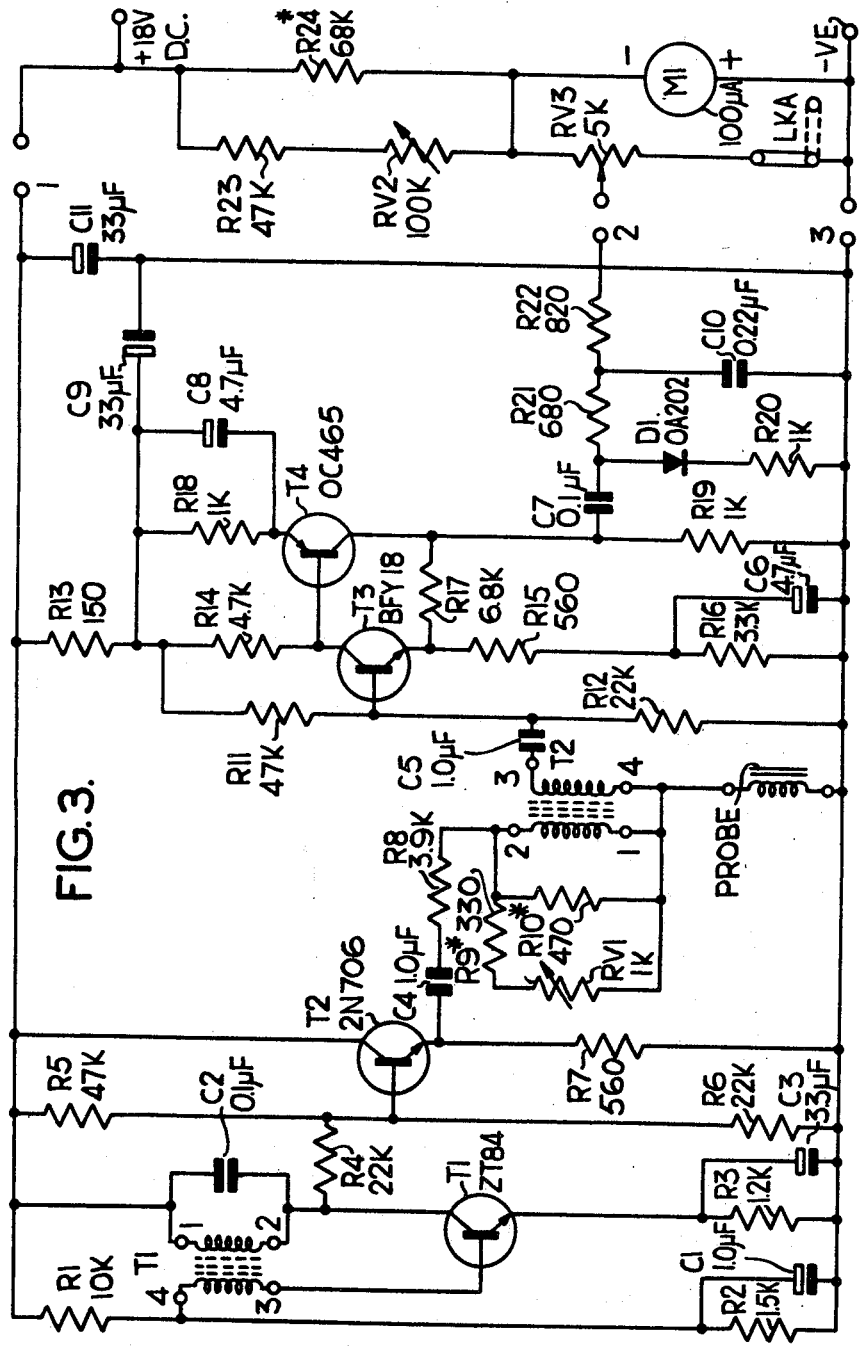
FIGURE 3 shows a diagram of a circuit used in an embodiment of the invention.
Figure 7:
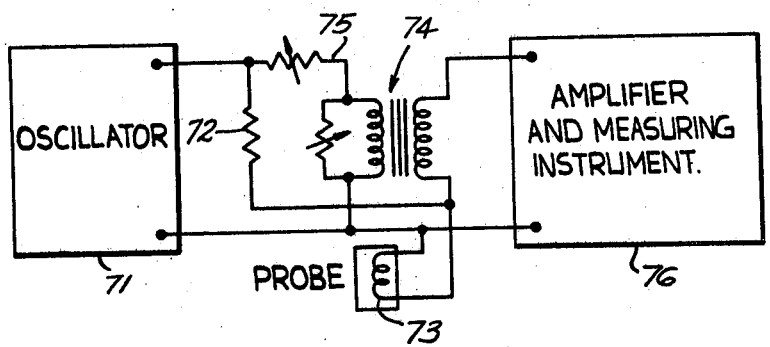
FIGURE 7 shows a diagram of a circuit used in a second embodiment of the invention.

The electronic circuit in FIG. 3, consists of a transistor oscillator, T1, followed by an emitter follower T2, which feeds the measuring circuit through a large resistor R8. The compensating voltage appropriate to the centre of the locus is produced by shunting the primary of transformer T2 with variable resistor RV1 (giving some adjustment) and this is subtracted from the probe voltage by the series connection of the secondary of the transformer T2 with the probe. In the circuit of FIG. 3 the primary inductance of the transformer T2 needs to be chosen so that adjustment of the shunt resistor network R9, R10, and RV1 will enable the correct compensating voltage to be reached. This was originally done by calculation of an appropriate value of the inductance. More convenient adjustment in two degrees of freedom (i.e., independent adjustment of the inductive and the reactive components of the balance circuit) can be obtained by various methods such as the use of a tapped inductance, or including capacitors in the circuit, or by feeding the balance circuit separately from the probe in parallel from oscillator through a variable resistance in addition to the shunt circuit, as shown in FIG. 7. The output from the measuring circuit is amplified by the transistors T3 and T4 in a circuit with large negative feed back, which is followed by a rectifier circuit incorporating diode D1. The output deflection is shown on a meter M1, which may be placed remotely from the remainder of the circuit and which has the bulk of the deflection backed off by means of a resistor network RV2, RV3, R23 and R24 so as to show clearly the changes in indication without a large standing deflection.

In the arrangement shown in FIGURE 7, the A.C. is supplied from an oscillator 71 via a resistor 72 to the probe 73. The balance circuit denoted by the numeral 74 is fed separately in parallel to the probe 73 from the oscillator 71 through a variable resistor 75. Once again the secondary of a transformer incorporated in the balance circuit 74 is connected in series with the probe 73. The amplitude of the resultant voltage is measured by a circuit shown diagrammatically as 76.

The eddy current method responds to changes in the resistance of the surface of the metal adjacent to the probe, through which its alternating field passes. Skin effect in ferromagnetic material causes current to be confined to the immediate surface. The presence of a crack breaking the surface interrupts these currents and gives a meter indication, which depends on the depth of the crack, up to a size comparable with the dimensions of the current loop, but which is largely independent of the width of the crack. Indication will also be dependent on how closely a crack passes under the probe. The method is not sensitive to sub-surface defects, unless they pass close to the surface.

Figure 4A:
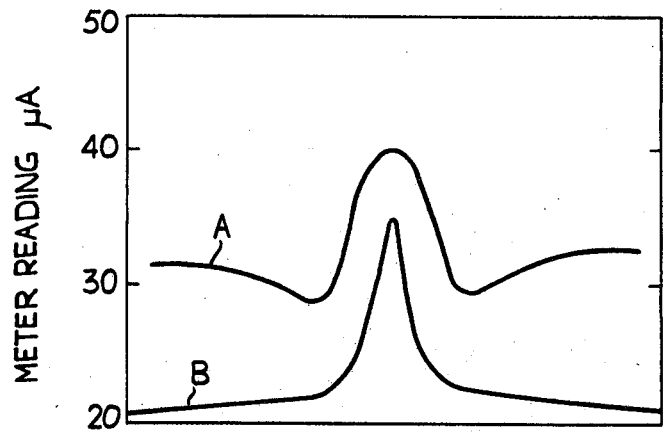
FIGURE 4a shows the variation of the deflection on a meter included in the circuit of FIGURE 3 when the test probe is respectively perpendicular and parallel to a crack.
Figure 4B:
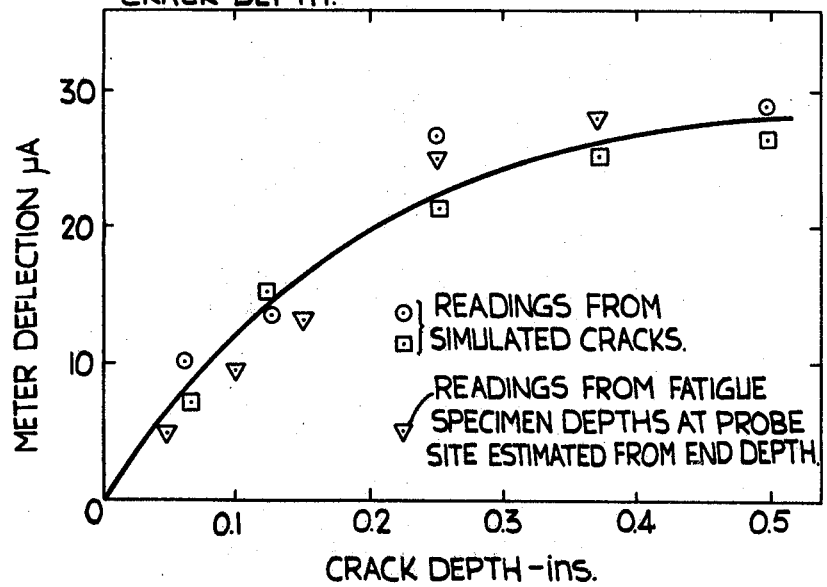
FIGURE 4b shows the dependence of the meter deflection on the depth of the crack.

Calibrations have been made using slots cut in a flat plate to simulate the crack. FIG. 4(a) shows the response when the probe is carried across the cut, both with the probe perpendicular (curve A) and parallel (curve B) to the cut. FIG. 4(b) shows the response to depth of the cut with the probe in its most sensitive position, i.e. immediately above the crack. FIG. 4(b) also includes points for a simulated crack made by soft soldering two steel plates in a right angled configuration with mica inserted to break the electrical continuity to several known depths.

In addition to this laboratory calibration, tests were made on a steel specimen undergoing fatigue testing in a large machine. A location was selected which showed no crack development at the time of the transfer. During the progress of the test the eddy current meter showed large deflections which correlated with visual estimates of crack depth at the edges of the plate. These results are plotted also in FIG. 4(b).

Figure 5A:
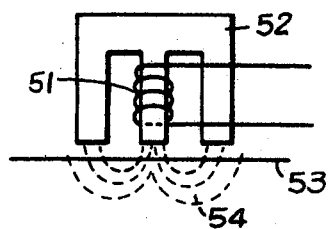
FIGURE 5a shows diagrammatically the magnetic circuit linking the test probe and a test sample.

A coil system 51 of $n$ turns which may contain separate coils for excitation and pickup, wound on a magnetic core 52, forming with the workpiece a closed magnetic circuit, is shown diagrammatically in FIG. 5(a). Lines 54 of alternating magnetic flux penetrate the workpiece 53 and an EMF exists perpendicular to them. Eddy currents flow in a rather ill-defined ring of metal lying in the surface around the central pole of the core 52. One can consider this current as flowing in a single turn magnetically coupled to the coil winding(s) and having a resistance of R. A magnetic flux is supposed linked with all windings, and in addition there are fluxes which fail to link with all coils. Consideration of the magnetic circuit suggests that the chief leakage flux links the coil windings but fails to link the work, but the leakage flux of the eddy current in the work is small and the leakage fluxes for the coil (not shown) windings individually are negligible.

When a separate pickup coil is used its voltage differs from that across the exciting coil only in that the latter includes a voltage due to the ohmic resistance of the windings, so that there is no great advantage to be had by using separate pickup coils.

Figure 5B:
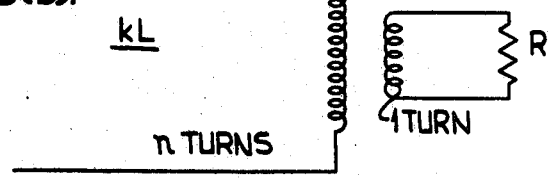
Figure 5C:
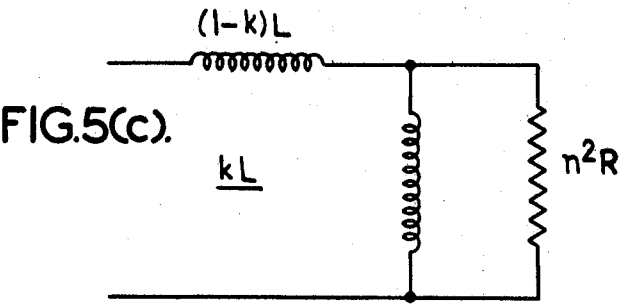
FIGURE 5c is a standard transformation of the equivalent circuit shown in FIGURE 5b.

The equivalent circuit, using a combined excitation and pickup coil then becomes as FIG. 5(b), showing separately the ohmic resistance R, the leakage inductance L, which constitutes the whole inductance when the coil is well clear of the work, and the transformer formed by the coil and work together. This then is re-drawn by standard transformation as FIG. 5(c).

Figure 6:
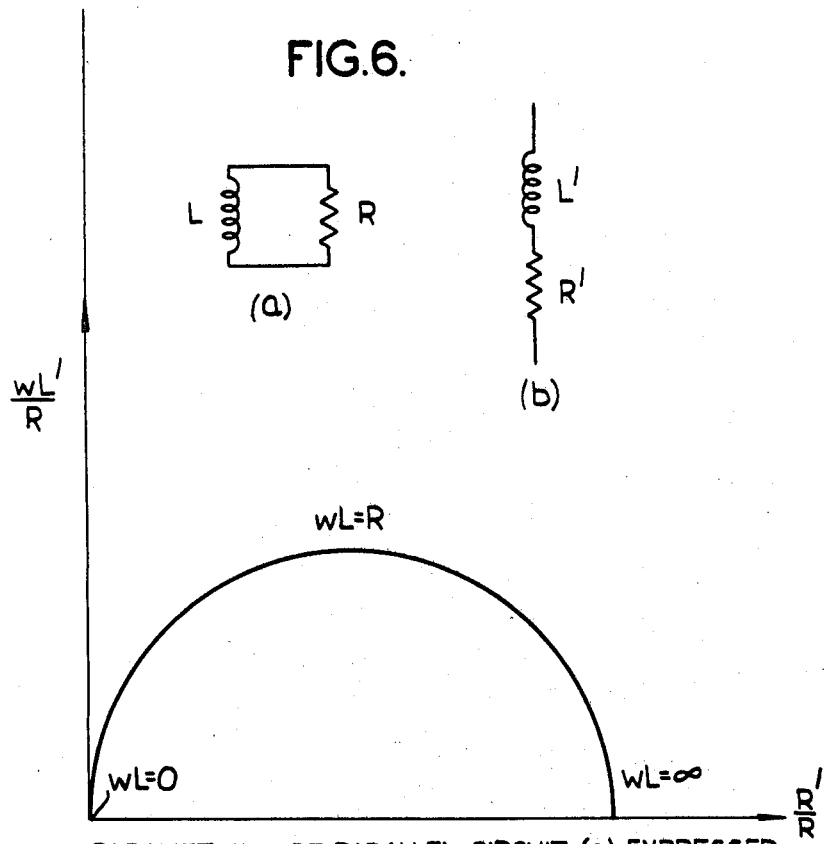
FIGURE 6 shows the parameters of the circuit of FIGURE 5c re-calculated for a series circuit.

When the probe is lifted on to the work with the magnetic coupling varying, the chief effect is to change the value of the transformer inductance, leaving R roughly constant. This circuit is a parallel circuit and when the equivalent parameters are calculated for series circuit a semi-circular locus is obtained, as in FIG. 6. The leakage inductance of the probe, which is that obtained when it is clear of the workpiece, remains as an additional inductive component though there may be a small reduction in it because the closure of the field reduces free poles along the circuit.

Referring again to FIGURE 1, in one application for checking welding the end of the probe core 12 was shaped to a V to fit into the angle of the welding, between the hull plating and a bulkhead. It is important that there should be no eddy currents in the core 12 itself. Accordingly the insulation between successive laminations was carefully maintained. Because E shaped laminations were not available at the time complete cores were assembled of U's and T's, .005" thick, cemented together under slight pressure with epoxy resin, then carefully cut off to the required shape. Afterwards the ends were wet ground on successively finer papers to 600 grit by the method usual in metallography. The cores were then etched for 3–5 minutes in aqua regia, followed by rinsing in sodium bicarbonate solution and water.

A winding of 500 turns, 36 S.W.G. wire, was made in a tapered form to fit the V shape on a thin support of polyester tape and transferred to the centre leg of the core 12 and bound up with more tape; connections were soldered on to the winding 11 and fixed temporarily with tape. The probe was impregnated with epoxy resin, given a vacuum treatment to assist penetration and placed in a polythene mould giving about ½ mm. resin build-up on the outer two legs, providing location for the probe. A suitable working frequency for such a probe is about 5 kc./s., which enables coils of other required impedance to be wound.

As in other instruments, observation of real effects is limited by spurious signals, described as drift or noise. Possible sources of such signals may be identified but the interference they are likely to cause is small. The drift from the electronic circuit is negligible if appropriate circircuits are used. Residual signals from probe movement only occur so far as balance is imperfect, and they too should be small. Some variation exists in the resistivity of materials other than that due to defects, for example a slightly different reading has been found between the inside and outside of a rolled mild steel bar. Such effects are not likely to be confused with correct indications from defects, and with a fixed probe monitoring crack growth the possibility of confusion is even less.

I claim:

1. A method for detecting discontinuities in ferromagnetic material comprising the steps of:
   applying an inductive test probe to the surface of a ferromagnetic test specimen while supplying a substantially constant alternating current input to the test probe, and
   obtaining an indication of the amplitude of a resultant voltage derived by vectorial addition of the voltage developed across the test probe and a compensating voltage having an amplitude and phase corresponding to the centre of curvature of a circular arc representing the variation of the amplitude and phase of the voltage developed across the test probe if the separation of the test probe from the specimen is varied, changes in amplitude of said resultant voltage being indicative of the presence of discontinuities in the specimen.

2. A method according to claim 1, including the step of traversing the probe over the surface of the test specimen.

3. A method according to claim 1, including the step of comparing the amplitude of said resultant voltage with the amplitude of the resultant voltage produced when the test probe is positioned over a fault of known dimensions.

4. Apparatus for the detection of discontinuities in ferromagnetic materials comprising:

an inductive test probe having at least one winding on a core of ferromagnetic material which has at least two free ends that may be applied to the surface of a ferromagnetic test specimen;

means for applying a substantially constant alternating input current to the test probe so as to develop a voltage across the test probe;

means for generating a compensating voltage corresponding in amplitude and phase to the centre of curvature of a circular arc representing the variation of the amplitude and phase of the voltage developed across the test probe if the separation of the test probe from the specimen is varied;

means for vectorially adding the compensating voltage to the voltage developed across the probe to derive a resultant voltage; and indicating means responsive to changes in the resultant voltage.

5. Apparatus according to claim 4, wherein the means for generating a compensating voltage comprises a transformer having a primary winding arranged to be fed with alternating current from the same source as a winding of the test probe and having a secondary winding connected in series with a winding of the test probe, the transformer primary winding being shunted by a variable resistance.

6. Apparatus according to claim 5, in which the transformer primary winding is fed by a second variable resistance in parallel with the winding of the test probe.

References Cited
UNITED STATES PATENTS

| | | | |
|---|---|---|---|
| 2,035,248 | 3/1936 | Scott | 324—34 |
| 2,214,625 | 9/1940 | Peterson | 324—34 |
| 2,576,173 | 11/1951 | Cornelius | 324—34 |
| 3,197,693 | 7/1965 | Libby | 324—40 |

ALFRED E. SMITH, Primary Examiner

U.S. Cl. X.R.

324—34, 37